Feb. 9, 1971  W. SIMON  3,562,129
CATION-SPECIFIC ELECTRODE SYSTEM
Filed Aug. 3, 1967  2 Sheets-Sheet 1

3,562,129
CATION-SPECIFIC ELECTRODE SYSTEM
Wilhelm Simon, Oberembrach, Switzerland, assignor to
Gebruder Moller Glasblaserie, Inhaber Willi Moller,
Zurich, Switzerland
Filed Aug. 3, 1967, Ser. No. 658,284
Claims priority, application Switzerland, Aug. 9, 1966,
11,428/66
Int. Cl. G01n 27/46
U.S. Cl. 204—195                                13 Claims

ABSTRACT OF THE DISCLOSURE

The present invention concerns an electrode system used for measuring cation activities and having a membrane in which said membrane comprises a cation specific component which forms a complex with the cation, the activity of which is to be determined, and which cation specific component is selected from the group comprising nonactin and its homologues, gramicidin and valinomycin. These electrode systems show unexpected selectivity and especially have a very high specificity for potassium ions over sodium ions. The invention furthermore is directed to a process for producing the said electrode system in which a membrane, which comprises the ion specific component and an inert material, is produced by impregnating the inert carrier material with a solution of the ion specific component.

---

Figure 1:
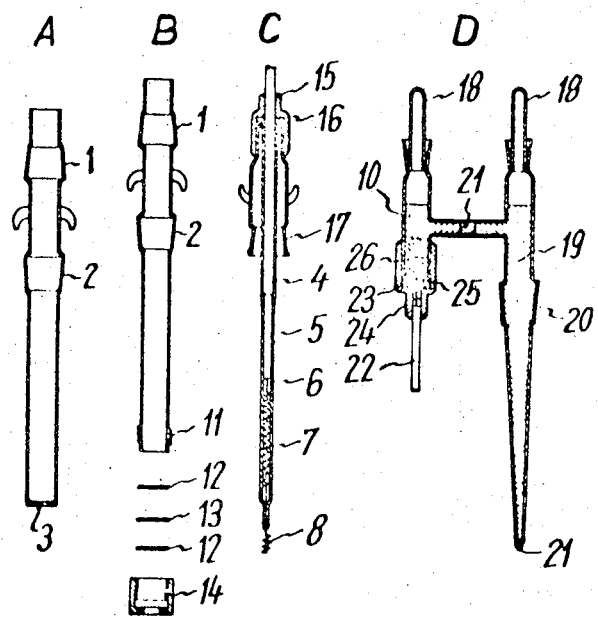

The principle of pH measurement by means of glass electrodes is based on a potential difference E(T), given by Nernst's equation by $$E(T) = \frac{R.T}{F} 2.303 \ (pH_0 - pH) \quad (1)$$

where

E(T)=electromotive force (EMF) of the measuring chain
R=gas constant
T=absolute temperature
F=Farady number set between two solutions with pH values of $pH_0$ and pH which are separated by a thin glass membrane.

For measuring this potential difference there are inserted in the two solutions pH-independent shunt electrodes which have relative to one another no potential difference (symmetrical chain) or a constant potential difference (asymmetrical chain). If the pH value of one solution ($pH_0$) is constant, then we have $$E(T) = E_0(T) - K(T) \cdot pH \quad (2)$$

The measured potential difference therefore varies at constant temperature linearly with the pH value of the measured substance being at 25° C. 59.2 mv./pH.

With a suitable choice of glass composition of the glass membrane glass electrodes can be produced which make it possible to measure, instead of the hydrogen ion activity, the sodium or potassium ion activity, the sodium or potassium ion activity with high selectivity. Glass electrodes are obtainable having a specificity for sodium ions over potassium ions of 10,000. The specificity for potassium over sodium attained by means of glass electrodes however up till now has only been in the range of about 30.

Through in-vivo tests in researches on oxidative phosphorylation and adenosine-triphosphatase induction (S. N. Graven, H. A. Lardy, D. Johnson and A. Rutter, Biochemistry 5, (1966) 1729) it was found that nonactin and its homologues, the gramicidines and valinomycin in-vivo (that is to say in the mitochondria of rat liver) showed ion-specific properties.

It has now been found that these organic materials embedded in inert carrier materials, likewise possess ion-specific properties.

This invention relates to an electrode system used for the determination of cation activities which has a membrane. According to the invention said membrane comprises a cation specific component which forms a complex with the cation and activity of which is to be determined and which cation specific component is selected from the group comprising nonactin and it homologues, gramicidins and valinomycin. The membrane preferably comprises a cation specific component and an inert material.

The membranes used in the electrode system in accordance with the invention can be used analogously to the glass membrane of glass electrodes and they permit the measurement of ion activities or ion concentrations with great selectivity.

For example the electrode system used for measuring ion activities can be the following electrochemical cell: Ag; AgCl, inner solution//membrane//test sample/0.1 M $NH_4NO_3$/KCl saturated, $Hg_2Cl_2$; Hg.

The inner aqueous solution can be such that it is 0.1 molar in the chlorides of all cations, which are to be tested in the series of experiments, and they can for example be buffered to a pH value of 8, it being possible to use for example as a buffer about 0.5 molar acetic acid and about 1.0 molar triethanolamine.

A form of embodiment of an electrode system according to the invention is illustrated in FIGS. 1A, 1B, 1C and 1D of the accompanying drawings. FIG. 1A illustrates an electrode body provided with a sintered glass disc 3. FIG. 1B illustrates an electrode body which is adapted for the use of foils as membranes. FIG. 1C shows an inner reference electrode, which can be inserted in the electrode body of FIG. 1A or FIG. 1B. FIG. 1D shows a reference electrode.

The electrode bodies of FIGS. 1A and 1B are provided with a ground-glass joint 1, which is used for the insertion of the reference electrode of FIG. 1C, which is provided with a ground-glass joint 17. Furthermore the electrode bodies FIGS. 1A and 1B have a ground-glass joint 2. The electrode body of FIG. 1A is provided with a sintered glass disc 3. The electrode body of FIG. 1B has a membrane 13, which is supported between two rubber rings 12. The arrangement consisting of the rubber rings and the membrane is interchangeably fastened to the electrode body by means of a glass screw thread 11 and the Teflon counterpart 14 fitting on to this.

The inner reference electrode of FIG. 1C is provided with an insulation 5 and a copper lead 6, which is welded on to a silver spiral 7. At the other end of the silver spiral 7 a platinum wire 8 is welded on, which has been silver-plated through electrolytic deposition and then chloridised, so that the spiral 8 represents a special form of embodiment of a silver/silver chloride electrode.

The reference electrode of FIG. 1D has closure members 18, which are used for filling the electrodes with an electrolyte 19. The electrolyte 19 is a 0.1 molar solution of $NH_4NO_3$ in water. The ground-glass joint 20 is used for inserting the reference electrode in the electrochemical cell. The reference electrode of FIG. 1D further has two plugs 21, which consist of a porous sintered oxidic material. The reference electrode of FIG. 1D is further provided with a platinum wire 23, which is immersed in a mercury-calomel electrode 25. At 22 there is shown an electrical connection and at 26 a cotton plug. The $NH_4NO_3$ - electrolyte 19 is separated from the electrolyte 10 by the plug 21, which electrolyte consists of a saturated, aqueous potassium chloride solution.

The electrode body of FIG. 1A or 1B is filled with the inner solution and then the inner reference electrode of FIG. 1C is inserted. The electrode arrangement, the inner reference electrode of FIG. 1C plus the electrode body of FIG. 1A or 1B, as well as reference electrode of FIG. 1D were immersed in the test solution to be measured, and the EMF-values determined. The EMF-values of the cells were determined with reference to an aqueous test solution, which in a series of experiments was 0.001 molar at the chlorides of all cations to be tested. The solution was buffered with acetic acid and triethanolamine to a pH-value of 8. For the calibration of the arrangement for determining a special cation, the concentration of this special cation was increased in the test solution by two powers of ten, that is to say to 0.1 molar. Then the EMF was determined in the usual way at 25° C.±0.1 with a standard-deviation of 0.1 mv. This measuring process was described by Simon, W. and Wegmann in Helv. Chim. Acta. 41, 2308–2322 (1958).

The electrode arrangement represented in FIGS. 1A, 1B, 1C and 1D and just described is however supposed to only illustrate one example for the application the membranes and it should be noted in this connection, that the electrode systems in accordance with the invention are only distinguished by the special membrane. As mentioned, the membrane comprises a cation-specific component which is selected from the group comprising nonactin and its homologues, gramicidin and valinomycin. All these compounds are macrocyclic compounds, i.e. macrocyclic compounds which either contain only C, H and O atoms, like gramicidin, nonactin and its homologues, or macrocyclic derivatives of amino acids and hydroxy-acids, like valinomycin. Regarding the production, isolation, constitution, and properties of the compounds used in the membranes reference should be made for example to the following documents: Gerlach and Prelog, Liebigs Ann. Chem 669 (1963) 121 (nonactines), Neubert and Lehninger, Biochem. Biophys. Acta 62 (1962) 556 (gramicidines) and Moore, Pressman, Biochem. Biophys. Res. Commun. 15 (1964) 562 (valinomycin).

The cation specific component can be either a single substance of the group comprising nonactin and its homologues, the gramicidins and valinomycin or any mixture of two or more components of the said group. Preferably however, mixtures which comprise at least two components of the above said group are used. In particular, mixtures of the various gramicidins or mixtures of the various actins can be used. For example, the cation specific component can be a mixture of actins which contains nonactin, monactin, dinactin and trinactin. Such mixtures of actins occur as metabolic products of actinomycetes. Since these mixtures of actins are difficult to separate, it is advantageous to employ the mixtures as such. Valinomycin is employed in a more or less pure form, however small amounts of other components of the above said group can be present without having any disadvantageous influence on the cation specificity, especially the potassium ion specificity.

The manner in which the membrane in accordance with the invention is used, is in no may critical. For example the membrane can consist of a porous, inactive material, for example a glass frit, a filter paper or a woven nylon fabric, in which the active component is embedded. Polyethylene films or gel formers are also for example suitable as an inactive carrier material for the ion-specific component.

If the membrane is produced using a glass carrier, then for this purpose for example the glass frits of a porosity G2 to G5 produced in Jena, Germany are suitable. These are advantageously treated with a solution, supersaturated at room temperature, of the ion-specific component. Suitable solvents for this component are for example halogenated hydrocarbons, in particular carbon tetrachloride or chloroform. The viscosity of the solution and also the porosity of the glass frit affect to a certain degree the specificity of the arrangement, with solutions of higher viscosity and frits of lower porosity it being possible in general to improve the selectivity of the measuring cell.

If polyethylene foils are used for producing the membranes then these preferably have a thickness of $25\mu$ to 0.1 mm. A hot solution of a gel former in a suitable solvent is saturated with the cation specific component. This solution is coated on to one side of the polyethylene foil. It however, is also possible to pour said solution onto a glass frit or to impregnate a filter paper with it or to coat and harden it on a material from which it is easily removable and to use the so obtained solid sheet material, (comprising the gel former containing the cation specific component) as membrane. As gel formers there can be used for example Thixcin B 968/1238, (Nuclear Enterprises, Edinburgh) or Thixotropix Gel Powder CAB-O-SIL, (Packhard Instrument G.m.b.H.; Frankfurt) and the solvent can be a hydrocarbon or hydrocarbon halide. Particularly preferred solvents are benzene, carbon-tetrachloride or chloroform. Best results were obtained with a hot solution of 1 gr. Thixcin B in 10 ml. benzene which solution was saturated with the cation specific component and solidified when cooled to room temperature.

The reason why the said compounds are effective as a cation specific component, has now been cleared up. This potassium specificity is due to the fact that the compounds form considerably more stable complexes with potassium than with sodium. Thus for example measurements which were carried out by means of the vapour pressure osmometry in methanol, proved that the complex formation constant of potassium with nonactin and its homologues at 30° C. is about 30 times higher than that of sodium.

By using the ion-specific membranes electrochemical cells can be produced, whose selectivity in respect of potassium ions in comparison with sodium is considerably greater than that of the hitherto known glass electrodes. As already mentioned the highest practically realisable selectivity in the case of glass electrodes hitherto amounts to 30, whereas through the new membranes selectivities of 750 can be obtained.

Figure 2:
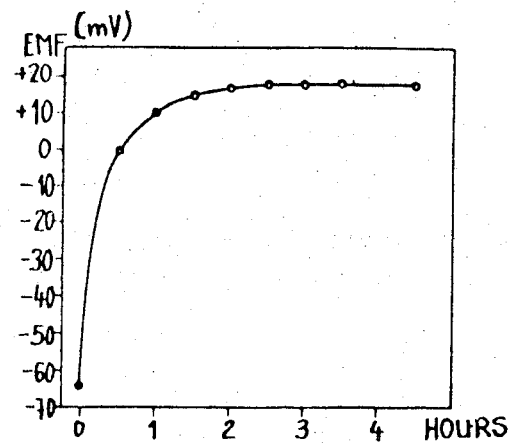

In FIG. 2 the variation of EMF with time is illustrated. In this experiment a membrane was used consisting of a sintered glass frit G4 and nonactin as well as its homologues. The electrode arrangement (an electrode body of FIG. 1A and inner reference electrode of FIG. 1C together with a reference electrode of FIG. 1D) was used. The solution which was used for an inner solution had a molarity of 0.1 of NaCl, KCl and $CaCl_2$ and was buffered to a pH value of 8 (about 0.5 molar solution of acetic acid and 1.0 molar of triethanolamine). The electrode and the reference electrode were immersed in the test sample solution. In FIG. 2 there is shown the change of the EMF, which occurs if a test sample solution, which is 0.001 molar in NaCl, KCl and $CaCl_2$ and has a pH-value of 8 is changed to a sample which is 0.001 molar in NaCl and $CaCl_2$ and likewise has a pH value of 8, but is 0.1 molar in KCl. It can be seen from this figure that constant values of the EMF are measured about 2 hours after the change of the samples.

Figure 3:
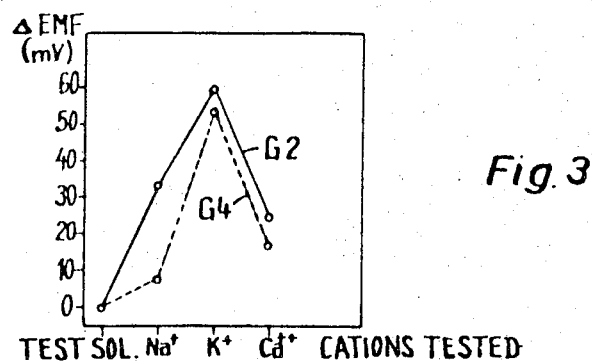

In FIG. 3 there are shown the differences in the EMF, that is to say the Δ-EMF-value.

These Δ-EMF-values were determined as follows. First the EMF of the solution which was 0.001 molar in NaCl, KCl and CaCl$_2$ (test solution 1) was determined, then the EMF of the solution which was 0.1 molar in one of the ions, sodium, potassium or calcium (solution 2) was determined and then again the EMF of the solution 1 was determined. In the case of solution 2 the EMF value was determined as soon as this had become constant. A mean value was taken between the two results obtained with solution 1. The difference between the EMF of solution 2 and the mean value of the EMF of solution 1 gives the Δ-SMF-value. In the example represented in FIG. 3 sintered glass of a porosity of G4 as well as sintered glass of a porosity of G2 was used as a membrane, which glass had been treated with a supersaturated solution of nonactin homologues in CCl$_4$, this solution having a low viscosity. It can be seen from FIG. 3 that by means of the fine porous glass a better selectivity can be obtained. The invention will now be more clearly explained in connection with examples:

Example 1

Glass frits of equal porosity were treated with a solution, supersaturated at room temperature, of nonactin homologues (20% nonactin, 35% monactin, 35% dinactin and 10% trinactin) in carbon tetrachloride (viscosity of the solution 12 poise, Contraves Epprecht Reomat 15). The frits were then used as membranes in usual electrochemical cells.

Figure 4:
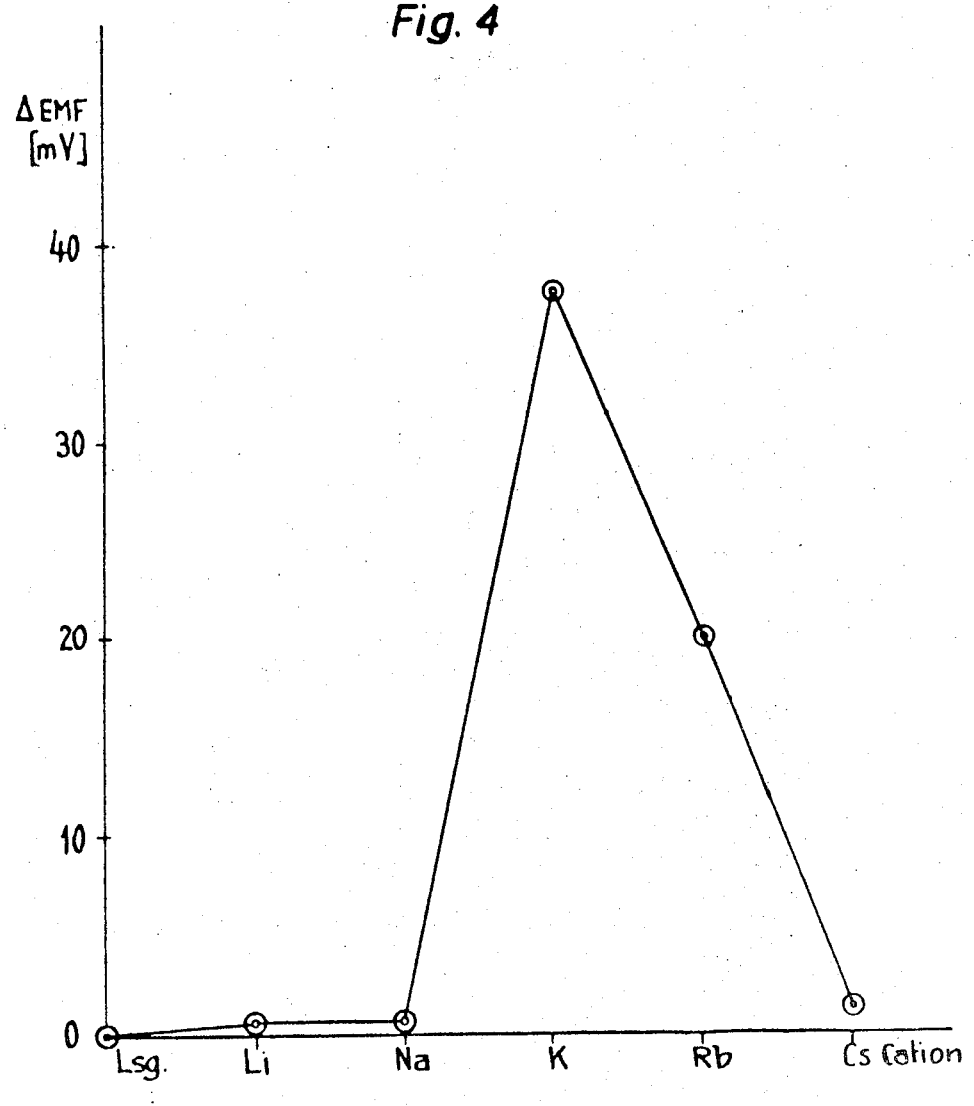

In the case of an impregnation of a glass frit G5 (Jena, Germany) with the above-mentioned solution of the nonactin homologues, a membrane is obtained, which was used in the electrochemical cell represented in FIGS. 1A, 1B and 1D, there being used as inner solution a solution buffered to pH 8 by means of acetic acid and triethanolamine, which was 0.1 molar in LiCl, NaCl, KCl, RbCl and CsCl. For the determination of the Δ-EMF-value the electrode and reference electrode were first put into a test sample, which was 0.001 molar in LiCl, NaCl, KCl, RbCl and CsCl and had a pH value of 8. Then this test sample was changed to a sample which showed a molarity of 0.1 of one of the said chlorides and had a molarity of 0.001 of each of the rest of the said chlorides and likewise had a pH value of 8. After the EMF value had become constant, it was determined. Immersion in test sample 1 was then effected again and the mean value of the two EMF determinations with test sample 1 calculated. The difference between this mean value of the EMF of the test sample 1, and the EMF of test sample 2 is the E-SMF-value of one of the said ions. These values are shown in FIG. 4 for Li$^+$, Na$^+$, K$^+$ and Cs$^+$ ions. The results clearly show the selectivity of the membranes for potassium in the presence of sodium.

In testing this membrane in other ordinary electrochemical cells the same results were obtained.

Example 2

The process described in Example 1 was repeated, a glass frit G5 being treated with a supersaturated solution of nonactin in carbon tetrachloride. In using these membranes in the above-mentioned electrochemical cell the same results were obtained.

In a further experiment the same procedure was used as above, however, a monactin solution in carbon tetrachloride was used, the viscosity of the solution being the same as that of the solution described in Example 1. The same results could again be obtained.

Example 3

The experiments described in Examples 1 and 2 were repeated, however, chloroform being used as a solvent instead of carbon tetrachloride. The viscosity of the solutions measured in a Contraves Epprecht-Reomat 15 again was about 12 poise. The above results were also obtained when using the mixture of nonactin homologues (Example 1) as well as when using pure nonactin or pure monactin.

It is illustrated through this example, that in using a certain glass frit, the properties of the membranes produced are substantially independent from whether a particular nonactin homologue or a mixture of nonactin homologues is used as ion specific component. This example further shows that the viscosity of the impregnating solution is of importance for the properties of the membrane produced by impregnating the glass frit with the said solution, that however the same results can be obtained by means of different solvents provided the solution has the same viscosity.

Example 4

A glass frit G5 (Jena, Germany) was impregnated with a saturated solution of valinomycin in chloroform. The membrane thus obtained was used in the electrochemical cell represented in FIGS. 1A, 1C and 1D, the same inner solution being used as that in Example 1, and also the outer solution (test sample 1 or test sample 2) correspond to that used in Example 1. The measured Δ-EMF-values corresponded to the results obtained in Example 1.

I claim:

1. An electrode system used for measuring cation activities, said electrode system comprising a membrane, an electrode body including means for supporting the membrane, and an electrode disposed in said body, said membrane comprising a cation-specific component which forms a complex with the cation, the activity of which is to be determined, said cation-specific component being a mixture of nonactin and homologues thereof and containing about 20 percent nonactin, about 35 percent monactin, about 35 percent dinactin and about 10 percent trinactin.

2. A process for producing an electrode system useful for measuring cation activities said electrode system having a membrane comprising an inert material and a cation-specific component which forms a complex with the cation activity of which is to be determined, the process comprising the step of impregnating the inert material with a solution of a cation-specific component selected from the group consisting of nonactin, homologues of nonactin, gramicidin and valiomycin in a solvent selected from the group consisting of hydrocarbon and hydrocarbon halides.

3. A process as claimed in claim 2, in which the solvent is carbon tetrachloride, chloroform or benzene.

4. An electrode system useful for measuring cation activities, said electrode system comprising a membrane, means including an electrode body for supporting the membrane, and an electrode disposed in said body, said membrane comprising a cation-specific component which forms a complex with a cation, the activity of which is to be determined, said cation-specific component being at least one member selected from the group consisting of nonactin, homologues of nonactin, gramicidins and valinomycin, and an inert carrier material.

5. An electrode system of claim 4 wherein the membrane comprises a porous inert carrier material having the cation-specific component embedded therein.

6. An electrode system of claim 4 wherein the membrane further comprises a solvent for the cation-specific component and the cation-specific component is present as a solution in the solvent.

7. The electrode system of claim 6 wherein the solution of the cation-specific component in the solvent is saturated at room temperature.

8. The electrode system of claim 6 wherein the cation-specific component is valinomycin.

9. The electrode system of claim 6 wherein the solution of the cation-specific component in the solvent is supersaturated at room temperature.

10. The electrode system of claim 9 wherein the cation-specific component is valinomycin.

11. An electrode system of claim 4 wherein the membrane comprises a fine porous glass frit impregnated with a saturated or supersaturated solution of the cation-specific component.

12. An electrode system of claim 4 wherein the cation-specific component is a mixture of nonactin and its homologues, monactin, dinactin and trinactin.

13. An electrode system of claim 4, wherein the cation-specific component is valinomycin.

References Cited

UNITED STATES PATENTS

| | | | |
|---|---|---|---|
| 3,131,133 | 4/1964 | Barendrecht | 204—1.1 |
| 3,398,066 | 8/1968 | Ilani | 204—1.1 |
| 3,429,785 | 2/1969 | Ross | 204—194 |

OTHER REFERENCES

Graven et al.: "Biochemistry," vol. 5, No. 5, May 1966, pp. 1729–1735.

TA-HSUNG TUNG, Primary Examiner

U.S. Cl. X.R.

204—1

PO-1050
(5/69)

UNITED STATES PATENT OFFICE
CERTIFICATE OF CORRECTION

Patent No. 3,562,129        Dated February 11, 1971

Inventor(s) Wilhelm Simon

It is certified that error appears in the above-identified patent and that said Letters Patent are hereby corrected as shown below:

Column 2, line 15, the word "and" should read --the--; line the word "it" should read --its--;
and insert Column 3, line 49, the term "Chem" should be followed by a period --Chem.--; line 73, the word "may" should read --way--. Column 5, line 14, the term "$\triangle$- SMF-value" should read --$\triangle$-EMF-value--; line 53, the term "E-SMF-value" shoul read --$\triangle$- EMF-value--; line 54, the term "$Ii^+$" should read --$Li^+$-- and after the term "$K^+$" insert --, $Rb^+$--. Column 6 line 44, in Claim 2, after "cation" insert --, the--.

Signed and sealed this 31st day of August 1971.

(SEAL)
Attest:

EDWARD M. FLETCHER, JR.
Attesting Officer

ROBERT GOTTSCHALK
Acting Commissioner of ]